May 6, 1941.  J. RIEBE  2,241,021
CLAMPING DEVICE
Filed July 19, 1939   2 Sheets-Sheet 1
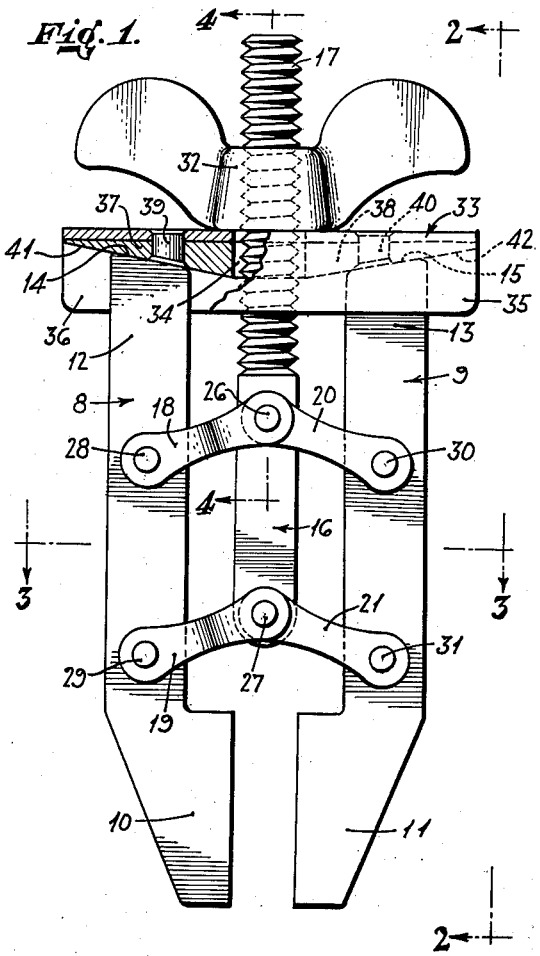
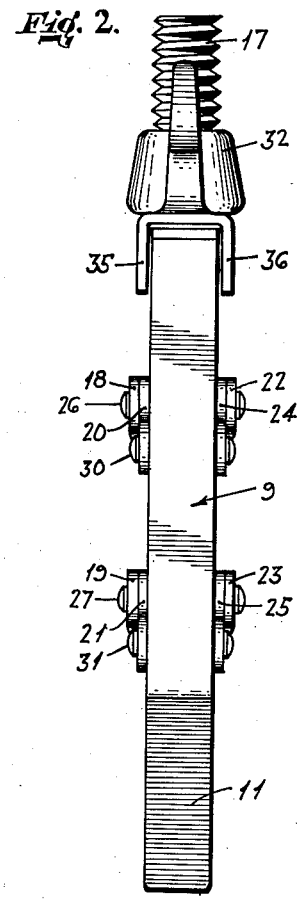
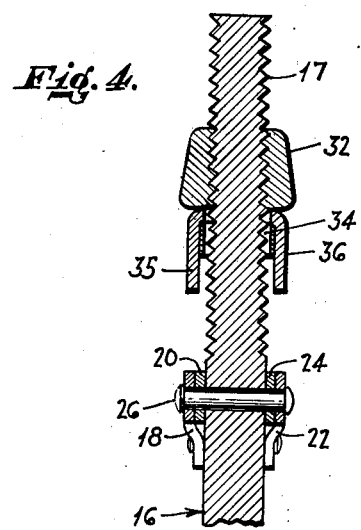
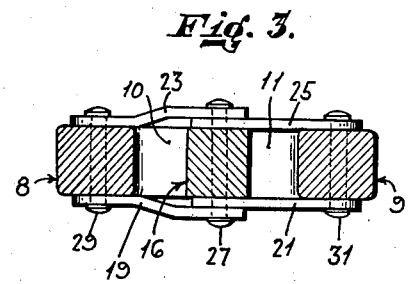
INVENTOR.
JOHANNES RIEBE
BY
ATTORNEYS

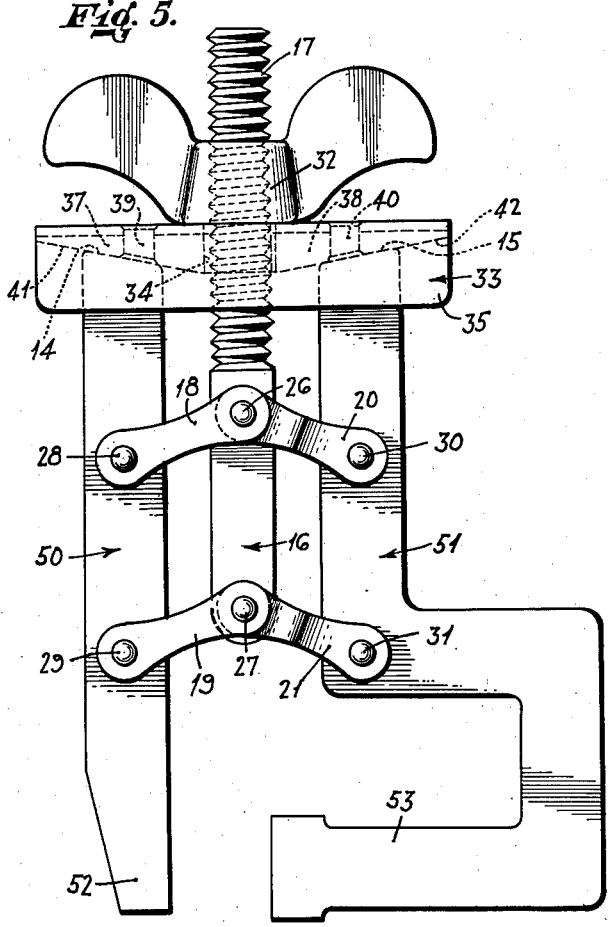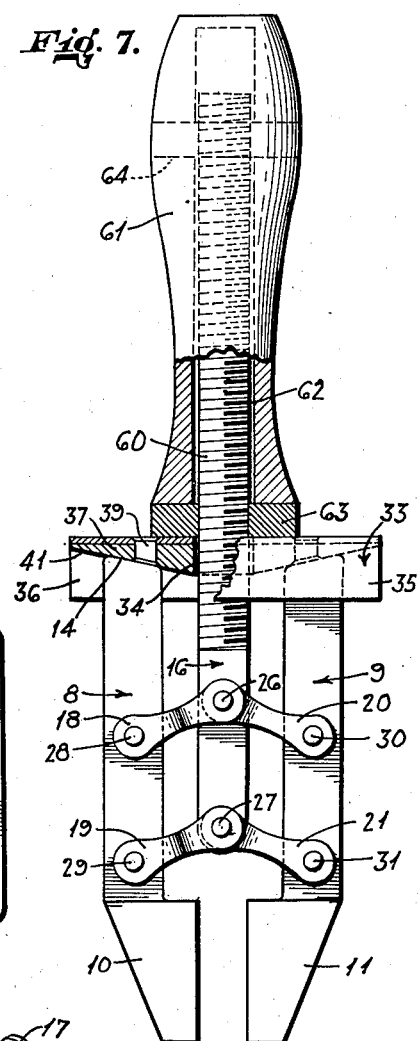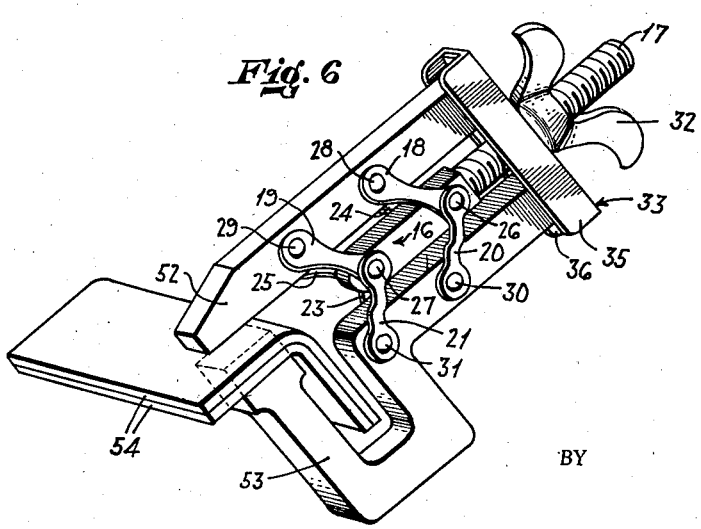

Patented May 6, 1941

2,241,021

UNITED STATES PATENT OFFICE 2,241,021

CLAMPING DEVICE

Johannes Riebe, Farmingdale, N. Y.

Application July 19, 1939, Serial No. 285,320

3 Claims. (Cl. 29—89)

This invention relates to a clamping device suitable for clamping sheets of metal and other objects while they are being worked on in a workshop and the like, and for many other purposes.

An object of the present invention is the provision of a clamp which is inexpensive to manufacture and simple in operation, and which is so constructed that the use of one hand of an operator will suffice to cause the clamping jaws to move in parallel directions toward or away from each other.

Other objects of the present invention will become apparent in the course of the following specification.

The objects of the present invention may be realized through the provision of a clamp the jaws of which are connected by links with a supporting member situated between the jaws, one end of the supporting member having the form of a bolt carrying a nut, which may have the form of a winged nut, a handle, or the like, and which may be in contact with a plate or similar jaw-actuating member. The plate is provided with inclined diverging surfaces engaging corresponding surfaces of the jaws.

A rotation of the nut upon the bolt in the proper direction will cause the plate to press against the jaws, causing them to swing along with their links about the supporting member and moving the clamping portions of the jaws in parallel directions toward each other.

The invention will appear more clearly from the following detailed description when taken in connection with the accompanying drawings, showing by way of example preferred embodiments of the inventive idea.

In the drawings:

Figure 1 is a front elevation, partly in section, of a clamp constructed in accordance with the principles of the present invention;

Figure 2 is a side view along the line 2—2 of Figure 1;

Figure 3 is a transverse section along the line 3—3 of Figure 1;

Figure 4 is a partial longitudinal section along the line 4—4 of Figure 1;

Figure 5 is a front view of a somewhat differently constructed clamp;

Figure 6 is a perspective view of the clamp shown in Figure 5 while in operation; and Figure 7 is a front view partly in section, of a differently constructed clamp.

Similar parts are designated by the same numerals throughout the drawings.

The clamp shown in Figures 1 to 4 of the drawings comprises two jaws 8 and 9 having clamping portions 10 and 11, and opposed end portions 12 and 13 provided with diverging inclined surfaces 14 and 15, respectively. A supporting member 16 is situated between the jaws 8 and 9.

The supporting member 16 may be rectangular in form, as shown in Figure 3, and is integral or firmly connected with a bolt 17 extending beyond the end portions 12 and 13 of the jaws 8 and 9.

In the illustrated construction, eight links 18 to 25 are used to connect the jaws 8 and 9 with the supporting member 16.

The member 16 carries two pivots 26 and 27 extending through the supporting member. The pivot 26 is used as a support for the adjacent ends of the links 18, 20, 22, and 24, while the pivot 27 carries the ends of the links 19, 21, 23, and 25. The jaw 8 carries two pivots 28 and 29. The pivot 28 extends through the ends of the links 18 and 22, while the pivot 29 carries the ends of the links 19 and 23. Corresponding pivots 30 and 31 carried by the jaw 9, are used for supporting the ends of the links 20, 24, and 21, 25, respectively.

In the construction shown in Figures 1, 2, and 4, a winged nut 32 is screwed upon the free end of the bolt 17.

The nut 32 may be in engagement with a U-shaped plate 33 having a central opening 34 through which the bolt 17 extends. The flanges 35 and 36 of the plate 33 enclose the end portions 12 and 13 of the jaws 8 and 9. The plate 33 is provided with inserts 37 and 38 which are firmly attached to the plate by rivets 39 and 40.

Obviously, the inserts 37 and 38 may be integral with the plate 33.

The inserts 37 and 38 of the plate 33 are provided with inclined diverging surfaces 41 and 42 which correspond to the surfaces 14 and 15 of the jaws 8 and 9 and are in contact with these surfaces.

The device is operated as follows:

In order to cause the clamping jaws 8 and 9 to move toward each other, the operator merely turns the winged nut 32 so as to cause it to move along the bolt 17 in a direction toward the pivots 26 and 27. The plate 33 will move along with the nut 32 in the same direction and the surfaces 41 and 42 of the plate 33 will press against the surfaces 14 and 15 of the jaws 8 and 9, causing the jaws to move in the same direction. The links 18 to 25 will swing about the pivots 26 and 27 in the course of this movement, which is brought to an end when the clamping portions 10 and 11 of the jaws 8 and 9 firmly clamp an object inserted between them.

In order to move the clamping portions 10 and 11 away from each other, the operator turns the winged nut 32 in the opposite direction, so that it moves upon the bolt 17 in a direction toward the free end of the bolt. The winged nut 32 is then moved away from the plate 33. When there is sufficient distance between the nut 32 and the plate 33, the operator presses manually the jaws 8 and 9 in a direction toward the plate 33, thereby causing the jaws to swing about the links 18 to 25 until the surfaces 14 and 15 of the jaws 8 and 9 again engage the surfaces 41 and 42 of the plate 33. In the course of this movement, the ends 10 and 11 of the jaws 8 and 9 are moved away from each other.

The clamp shown in Figures 5 and 6 comprises the supporting member 16, the bolt 17 and the winged nut 32 adapted to engage the plate 33. The links 18, 19, 20, 21, 23, 24 and 25 (Figure 6) connect the supporting member 16 with jaws 50 and 51. In this construction, the clamping portion 52 of the jaw 50 is substantially flush with the remaining portion of the jaw, while the clamping portion 53 of the jaw 51 is U-shaped to facilitate the insertion of angular objects 54.

The clamp shown in Figure 7 comprises the supporting member 16 which is connected by links with the jaws 8 and 9. The jaws engage the plate 33 enclosing a bolt 60 which is substantially longer than those heretofore described. A handle 61 comprises an inner hollow portion 62 within which the bolt 60 is situated. The handle is provided with two nuts 63 and 64 having the form of rings, which constitute a part of the handle 61 and which are provided with inner threads meshing with the threads of the bolt 60. In this construction, the turning of the handle 61 relatively to the bolt 60 will cause the jaws 8 and 9 to move toward each other and will enable a movement of the jaws away from each other.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. A clamping device comprising two closely spaced elongated jaw members having clamping portions offset toward one another at the lower clamping ends thereof and having end surfaces at the upper ends thereof slightly inclined across the longitudinal axes of the jaw members and inclined toward the central axis of the device and toward the clamping portions of the jaw members, a central elongated supporting member positioned between said jaw members and terminating above the clamping portions and extending beyond the inclined upper ends of the jaw members, links pivotally connected to and extending transversely between said central member and said jaw members, a plate extending across the upper inclined end of said jaw members and having inclined faces contacting the inclined end surfaces of the jaw members and means operatively cooperating with said elongated supporting member and said plate to relatively move said plate and said elongated supporting member toward each other, whereby said inclined surfaces and links will draw said jaws together.

2. A clamping device comprising two closely spaced elongated jaw members having clamping portions offset toward one another at the lower clamping ends thereof and having end surfaces at the upper ends thereof slightly inclined across the longitudinal axes of the jaw members and inclined toward the central axis of the device and toward the clamping portions of the jaw members, a central elongated supporting member positioned between said jaw members and terminating above the clamping portions and extending beyond the inclined upper ends of the jaw members, links pivotally connected to and extending transversely between said central member and said jaw members, a transverse channel enclosure member, U-shaped in cross section, enclosing the inclined upper end portions of said jaw members having oppositely diverging inclined camming contact surfaces contacting said inclined upper end portions, said enclosure member having a central opening in its base, a threaded extension of said central member extending through said central opening, a threaded member on said extension abutting the base of enclosure member to move said extension beyond said enclosure and to bring said jaw members together.

3. A clamping device comprising two closely spaced elongated jaw members having clamping portions offset toward one another at the lower clamping ends thereof, a central elongated supporting member positioned between said jaw members and terminating above the clamping portions and extending beyond the upper ends of the jaw members, links pivotally connected to and extending transversely between said central member and said jaw members, a transverse channel enclosure member, U-shaped in cross section, enclosing the upper end portions of said jaw members having contact surfaces contacting said upper end portions, said enclosure member having a central opening in its base, a threaded extension of said central member extending through said central opening, a threaded member on said extension abutting the base of enclosure member to move said extension beyond said enclosure and to bring said jaw members together.

JOHANNES RIEBE.